United States Patent
Gilbert-Eyres et al.

(10) Patent No.: US 12,469,390 B2
(45) Date of Patent: Nov. 11, 2025

(54) SYSTEM AND METHOD FOR SELECTING A PARKING SPOT FOR A VEHICLE

(71) Applicant: GM GLOBAL TECHNOLOGY OPERATIONS LLC, Detroit, MI (US)

(72) Inventors: Matthew E. Gilbert-Eyres, Rochester Hills, MI (US); Adam L. Wright, Livonia, MI (US); Matthew Neely, Rochester, MI (US); Eric T. Hosey, Rochester Hills, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 293 days.

(21) Appl. No.: 18/323,459

(22) Filed: May 25, 2023

(65) Prior Publication Data
US 2024/0395146 A1    Nov. 28, 2024

(51) Int. Cl.
| | |
|---|---|
| *G08G 1/14* | (2006.01) |
| *B60W 30/06* | (2006.01) |
| *B60W 60/00* | (2020.01) |
| *G06Q 50/40* | (2024.01) |

(52) U.S. Cl.
CPC .......... *G08G 1/149* (2013.01); *B60W 30/06* (2013.01); *B60W 60/001* (2020.02); *G06Q 50/40* (2024.01); *G08G 1/143* (2013.01)

(58) Field of Classification Search
CPC ........ G08G 1/149; G08G 1/143; G08G 1/146; B60W 30/06; B60W 60/001; B60W 60/0025; G06Q 50/40
See application file for complete search history.

(56) References Cited

U.S. PATENT DOCUMENTS

| | | | |
|---|---|---|---|
| 9,508,260 B2 * | 11/2016 | Shaik | G01C 21/3407 |
| 9,984,572 B1 * | 5/2018 | Newman | G08G 1/096758 |
| 10,157,543 B1 * | 12/2018 | Shah | G08G 1/146 |
| 10,482,766 B2 * | 11/2019 | Mowatt | G08G 1/146 |
| 10,586,452 B2 * | 3/2020 | Kapinos | G08G 1/143 |
| 10,891,806 B1 * | 1/2021 | Chaudhuri | G06Q 20/322 |
| 10,957,198 B1 * | 3/2021 | Hao | G08G 1/14 |
| 11,935,410 B2 * | 3/2024 | Humphreys | G08G 1/144 |
| 2012/0056758 A1 * | 3/2012 | Kuhlman | G08G 1/14 340/932.2 |
| 2012/0095812 A1 * | 4/2012 | Stefik | G08G 1/142 705/13 |
| 2013/0024218 A1 * | 1/2013 | Fink | G06Q 10/02 705/5 |
| 2017/0124874 A1 * | 5/2017 | Cai | G08G 1/04 |

(Continued)

*Primary Examiner* — Kenny Nguyen
(74) *Attorney, Agent, or Firm* — Quinn IP Law

(57) ABSTRACT

A method of selecting a parking spot for an autonomous vehicle. The method includes receiving a parking request to park the autonomous vehicle at a parking infrastructure and determining a parking priority for the autonomous vehicle. A parking space is assigned for the autonomous vehicle from a pool of available parking spaces based on the parking priority determined for the autonomous vehicle. A departure status of the autonomous vehicle is monitored to determine if the autonomous vehicle is leaving the parking space. The parking space is associated with the pool of available parking spaces based on the departure status of the autonomous vehicle changing to leaving the parking space.

19 Claims, 4 Drawing Sheets

(56) References Cited

U.S. PATENT DOCUMENTS

| | | | |
|---|---|---|---|
| 2018/0018870 A1* | 1/2018 | Sehra | G08G 1/04 |
| 2018/0121833 A1* | 5/2018 | Friedman | G01C 21/3453 |
| 2018/0218605 A1* | 8/2018 | Mowatt | G08G 1/144 |
| 2019/0114917 A1* | 4/2019 | Kapinos | G08G 1/165 |
| 2019/0385265 A1* | 12/2019 | Liu | H04W 4/029 |
| 2020/0160710 A1* | 5/2020 | Obayashi | G08G 1/143 |
| 2020/0211071 A1* | 7/2020 | Rosas-Maxemin | G06Q 30/0284 |
| 2020/0258388 A1* | 8/2020 | Nakka | G08G 1/143 |
| 2020/0307648 A1* | 10/2020 | Noguchi | G06Q 10/02 |
| 2020/0394913 A1* | 12/2020 | Reaser | G08G 1/144 |
| 2021/0019671 A1* | 1/2021 | Cao | G08G 1/146 |
| 2021/0316718 A1* | 10/2021 | Sugano | G06Q 10/20 |
| 2021/0343145 A1* | 11/2021 | Zhao | H04N 7/188 |
| 2022/0013012 A1* | 1/2022 | Higuchi | G08G 1/143 |
| 2022/0136855 A1* | 5/2022 | Higuchi | G08G 1/146 701/533 |
| 2022/0246034 A1* | 8/2022 | Humphreys | G08G 1/144 |
| 2023/0072922 A1* | 3/2023 | Hug | B60W 60/0025 |
| 2023/0133512 A1* | 5/2023 | Yigit | G01C 21/3617 701/420 |
| 2023/0306846 A1* | 9/2023 | Sasatani | G08G 1/141 |
| 2024/0153386 A1* | 5/2024 | Hirata | G08G 1/146 |
| 2024/0367676 A1* | 11/2024 | Xiao | B60W 60/001 |

\* cited by examiner

SYSTEM AND METHOD FOR SELECTING A PARKING SPOT FOR A VEHICLE

The present disclosure relates to a system and a method for selecting a parking spot for a vehicle, such as an autonomous vehicle.

Autonomous vehicles include sensors, such as lidar, radar, and cameras, operable to detect vehicle operation and the environment surrounding the vehicle, and a computing device operable to control aspects of vehicle operation. Autonomous vehicles generally employ a vehicle navigation system integrated with vehicle controls, drive-by-wire systems, vehicle-to-vehicle communication, and/or vehicle-to-infrastructure technology to identify vehicle position and navigate the vehicle.

Typically, a vehicle navigation system uses a global positioning system (GPS) system to obtain its position data, which is then correlated to the vehicle's position relative to a surrounding geographical area. Based on the GPS signal, when directions to a specific waypoint are needed, routing to such a destination may be calculated, thereby determining a vehicle path. Specifically, the vehicle sensors and the computing device may cooperate to identify intermediate way points and maneuver the vehicle between such way points to maintain the vehicle on the selected path.

When the vehicle reaches a selected parking infrastructure, such as a parking lot or a multi-level parking structure, the vehicle must select a parking space at the infrastructure to park the vehicle.

SUMMARY

Disclosed herein is a method of selecting a parking spot for an autonomous vehicle. The method includes receiving a parking request to park the autonomous vehicle at a parking infrastructure and determining a parking priority for the autonomous vehicle. A parking space is assigned for the autonomous vehicle from a pool of available parking spaces based on the parking priority determined for the autonomous vehicle. A departure status of the autonomous vehicle is monitored to determine if the autonomous vehicle is leaving the parking space. The parking space is associated with the pool of available parking spaces based on the departure status of the autonomous vehicle changing to leaving the parking space.

Another aspect of the disclosure may include providing directions to the autonomous vehicle to navigate to the parking space.

Another aspect of the disclosure may include receiving the parking request for the autonomous vehicle includes authenticating the parking request.

Another aspect of the disclosure may include assigning the parking space for the autonomous vehicle includes reviewing a vehicle profile associated with the autonomous vehicle having predetermined parking preferences for the autonomous vehicle and assigning the parking space to the autonomous vehicle based on the predetermined parking preferences and the parking priority.

Another aspect of the disclosure may be where receiving the parking request includes placing the autonomous vehicle into a parking queue with a plurality of other vehicles requesting parking at the parking infrastructure.

Another aspect of the disclosure may be where determining the parking priority includes assigning a parking priority score to the autonomous vehicle based on a plurality of predetermined criteria.

Another aspect of the disclosure may be where the plurality of predetermined criteria includes a parking membership associated with the parking infrastructure and the parking priority score is based on a membership level with the parking infrastructure.

Another aspect of the disclosure may be where the plurality of predetermined criteria includes a frequency of the autonomous vehicle being assigned a parking space at the parking infrastructure.

Another aspect of the disclosure may be where the plurality of predetermined criteria includes a disability status associated with the autonomous vehicle.

Another aspect of the disclosure may be where assigning the parking space for the autonomous vehicle from the pool of available parking spaces based on the parking priority includes assigning the autonomous vehicle the parking space based on the parking priority score.

Another aspect of the disclosure may include assigning the autonomous vehicle a temporary parking space prior to assigning the parking space if the pool of available parking spaces does not include an available parking space matching the parking priority score of the autonomous vehicle.

Another aspect of the disclosure may be where assigning the parking space for the autonomous vehicle remains in standby until the pool of available parking spaces includes an available parking space matching the parking priority score of the autonomous vehicle.

Another aspect of the disclosure may be where associating the parking space with the pool of available parking spaces is based on the departure status of the autonomous vehicle changing to vacated the parking space.

Another aspect of the disclosure may be where associating the parking space with the pool of available parking spaces based on the departure status of the autonomous vehicle changing to leaving the parking space occurs prior to the autonomous vehicle vacating the parking space.

Disclosed herein is a non-transitory computer-readable storage medium embodying programmed instructions which, when executed by a processor, are operable for performing a method. The method includes receiving a parking request to park the autonomous vehicle at a parking infrastructure and determining a parking priority for the autonomous vehicle. A parking space is assigned for the autonomous vehicle from a pool of available parking spaces based on the parking priority determined for the autonomous vehicle. A departure status of the autonomous vehicle is monitored to determine if the autonomous vehicle is leaving the parking space. The parking space is associated with the pool of available parking spaces based on the departure status of the autonomous vehicle changing to leaving the parking space.

Disclosed herein is an autonomous vehicle system. The system includes a traction motor, a traction battery in communication with the traction motor, a plurality of sensors, and a controller in communication with the plurality of sensors. The controller is configured to send a parking request to park the autonomous vehicle at a parking infrastructure and receive an assigned parking space from a pool of available parking spaces based on a parking priority score determined for the autonomous vehicle. The controller is also configured to navigate to the assigned parking space within the parking infrastructure.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may include a number of hardware, software, and/or firmware components configured to perform the specified functions.

Figure 1:
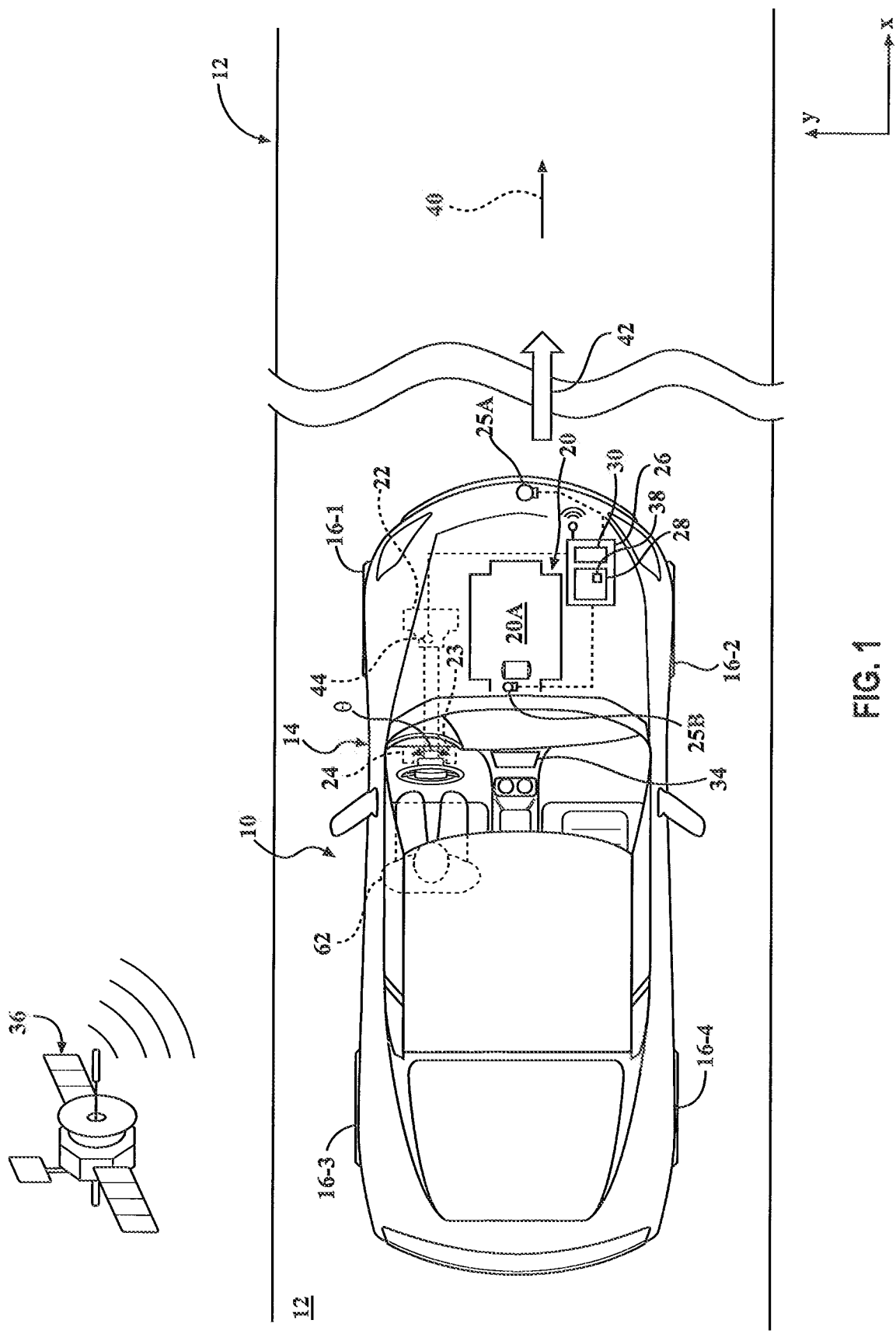
FIG. 1 is a schematic illustration of an example motor vehicle.

Referring to the FIGS., wherein like numerals indicate like parts referring to the drawings, wherein like reference numbers refer to like components, FIG. 1 shows a schematic view of a motor vehicle 10 positioned relative to a road surface, such as a vehicle lane 12. As shown in FIG. 1, the vehicle 10 includes a vehicle body 14, a first axle having a first set of road wheels 16-1, 16-2, and a second axle having a second set of road wheels 16-3, 16-4 (such as individual left-side and right-side wheels on each axle). Each of the road wheels 16-1, 16-2, 16-3, 16-4 employs tires configured to provide fictional contact with the vehicle lane 12. Although two axles, with the respective road wheels 16-1, 16-2, 16-3, 16-4, are specifically shown, nothing precludes the motor vehicle 10 from having additional axles.

As shown in FIG. 1, a vehicle suspension system operatively connects the vehicle body 14 to the respective sets of road wheels 16-1, 16-2, 16-3, 16-4 for maintaining contact between the wheels and the vehicle lane 12, and for maintaining handling of the motor vehicle 10. The motor vehicle 10 additionally includes a drivetrain 20 having a power-source or multiple power-sources 20A, which may be an internal combustion engine (ICE), an electric traction motor with a traction battery, or a combination of such devices, configured to transmit a drive torque to the road wheels 16-1, 16-2 and/or the road wheels 16-3, 16-4. The motor vehicle 10 also employs vehicle operating or control systems, including devices such as one or more steering actuators 22 (for example, an electrical power steering unit) configured to steer the road wheels 16-1, 16-2, a steering angle (θ), an accelerator device 23 for controlling power output of the power-source(s) 20A, a braking switch or device 24 for retarding rotation of the road wheels 16-1 and 16-2 (such as via individual friction brakes located at respective road wheels), etc.

As shown in FIG. 1, the motor vehicle 10 includes at least one sensor 25A and an electronic controller 26 that cooperate to at least partially control, guide, and maneuver the vehicle 10 in an autonomous mode during certain situations. As such, the vehicle 10 may be referred to as an autonomous vehicle. To enable efficient and reliable autonomous vehicle control, the electronic controller 26 may be in operative communication with the steering actuator(s) 22 configured as an electrical power steering unit, accelerator device 23, and braking device 24. The sensors 25A of the motor vehicle 10 are operable to sense the vehicle lane 12 and monitor a surrounding geographical area and traffic conditions proximate the motor vehicle 10.

The sensors 25A of the vehicle 10 may include, but are not limited to, at least one of a Light Detection and Ranging (LIDAR) sensor, radar, and camera located around the vehicle 10 to detect the boundary indicators, such as edge conditions, of the vehicle lane 12. The type of sensors 25A, their location on the vehicle 10, and their operation for detecting and/or sensing the boundary indicators of the vehicle lane 12 and monitor the surrounding geographical area and traffic conditions are understood by those skilled in the art, are not pertinent to the teachings of this disclosure, and are therefore not described in detail herein. The vehicle 10 may additionally include sensors 25B attached to the vehicle body and/or drivetrain 20.

Figure 3:
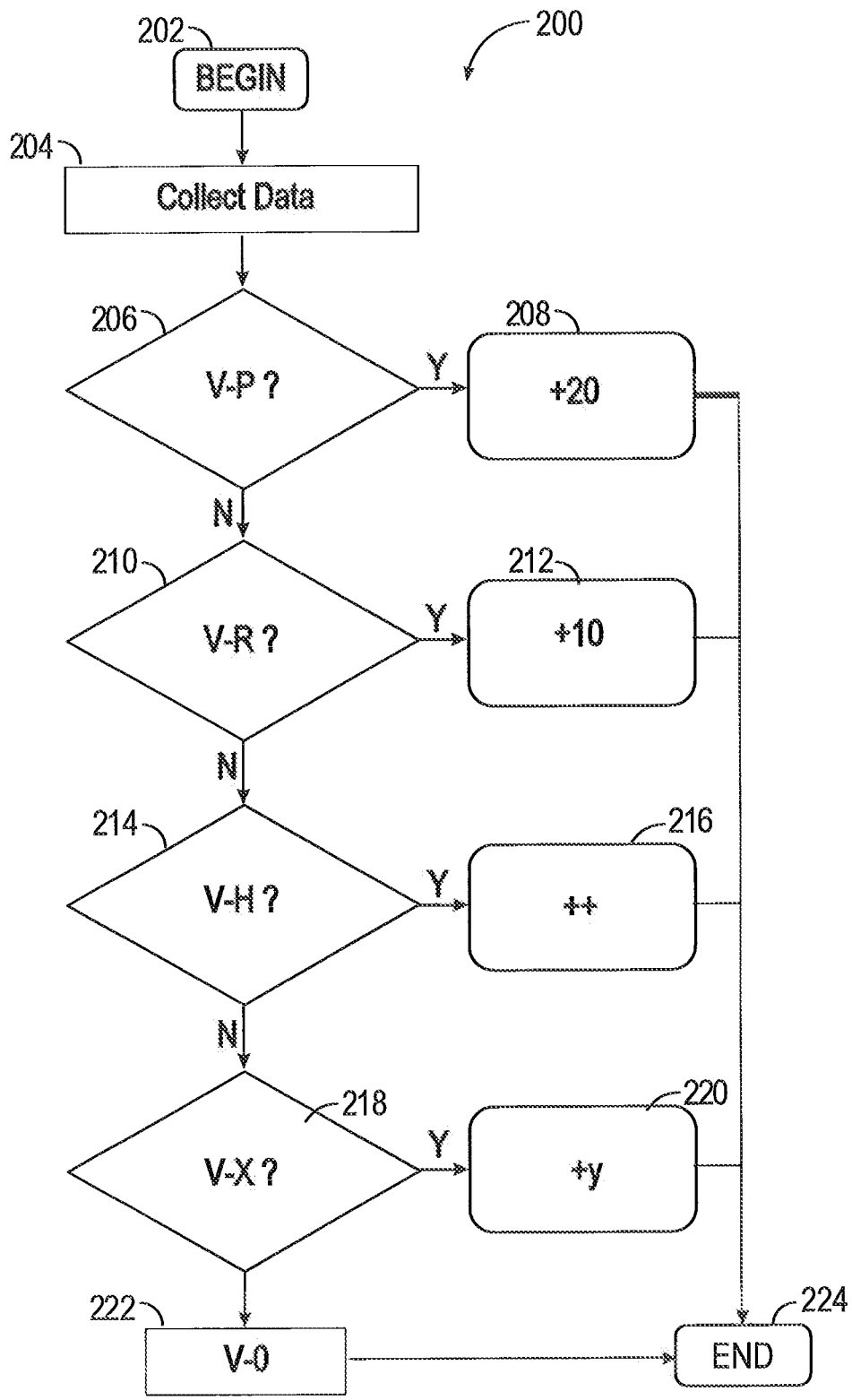
FIG. 3 illustrates an example priority flow for determining parking priority.

The electronic controller 26 is disposed in communication with the sensors 25A of the vehicle 10 for receiving their respective sensed data related to the detection or sensing of the vehicle lane 12 and monitoring of the surrounding geographical area and traffic conditions. The electronic controller 26 may alternatively be referred to as a control module, a control unit, a controller, a vehicle 10 controller, a computer, etc. The electronic controller 26 may include a computer and/or processor 28, and include software, hardware, memory, algorithms, connections (such as to sensors 25A and 25B), etc., for managing and controlling the operation of the vehicle 10. As such, a method, described below and generally represented in FIG. 3, may be embodied as a program or algorithm partially operable on the electronic controller 26. It should be appreciated that the electronic controller 26 may include a device capable of analyzing data from the sensors 25A and 25B, comparing data, making the decisions required to control the operation of the vehicle 10, and executing the required tasks to control the operation of the vehicle 10.

The electronic controller 26 may be embodied as one or multiple digital computers or host machines each having one or more processors 28, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk, hard disk, magnetic tape or other magnetic medium, a CD-ROM, DVD, and/or other optical medium, as well as other possible memory devices such as flash memory.

The electronic controller 26 includes a tangible, non-transitory memory 30 on which computer-executable instructions, including one or more algorithms, are recorded for regulating operation of the motor vehicle 10. The subject algorithm(s) may specifically include an algorithm configured to monitor localization of the motor vehicle 10 and determine the vehicle's heading relative to a mapped vehicle trajectory on a particular road course to be described in detail below.

The motor vehicle 10 also includes a vehicle navigation system 34, which may be part of integrated vehicle controls, or an add-on apparatus used to find travel direction in the vehicle. The vehicle navigation system 34 is also operatively connected to a global positioning system (GPS) 36 using an earth orbiting satellite. The vehicle navigation system 34 in connection with the GPS 36 and the above-mentioned sensors 25A may be used for automation of the vehicle 10. The electronic controller 26 is in communication with the GPS 36 via the vehicle navigation system 34. The vehicle navigation system 34 uses a satellite navigation device (not shown) to receive its position data from the GPS 36, which is then correlated to the vehicle's position relative to the surrounding geographical area. Based on such information, when directions to a specific waypoint are needed, routing to such a destination may be mapped and calculated. On-the-fly terrain and/or traffic information may be used to adjust the route. The current position of a vehicle 10 may be calculated via dead reckoning—by using a previously determined position and advancing that position based upon given or estimated speeds over elapsed time and course by way of discrete control points.

The electronic controller 26 is generally configured, i.e., programmed, to determine or identify localization 38 (current position in the X-Y plane, shown in FIG. 1), velocity, acceleration, yaw rate, as well as intended path 40, and heading 42 of the motor vehicle 10 on the vehicle lane 12. The localization 38, intended path 40, and heading 42 of the motor vehicle 10 may be determined via the navigation system 34 receiving data from the GPS 36, while velocity, acceleration (including longitudinal and lateral g's), and yaw rate may be determined from vehicle sensors 25B. Alternatively, the electronic controller 26 may use other systems or detection sources arranged remotely with respect to the vehicle 10, for example a camera, to determine localization 38 of the vehicle relative to the vehicle lane 12.

As noted above, the motor vehicle 10 may be configured to operate in an autonomous mode guided by the electronic controller 26. In such a mode, the electronic controller 26 may further obtain data from vehicle sensors 25B to guide the vehicle along the desired path, such as via regulating the steering actuator 22. The electronic controller 26 may be additionally programmed to detect and monitor the steering angle (θ) of the steering actuator(s) 22 along the desired path 40, such as during a negotiated turn. Specifically, the electronic controller 26 may be programmed to determine the steering angle (θ) via receiving and processing data signals from a steering position sensor 44 (shown in FIG. 1) in communication with the steering actuator(s) 22, accelerator device 23, and braking device 24.

Figure 2:
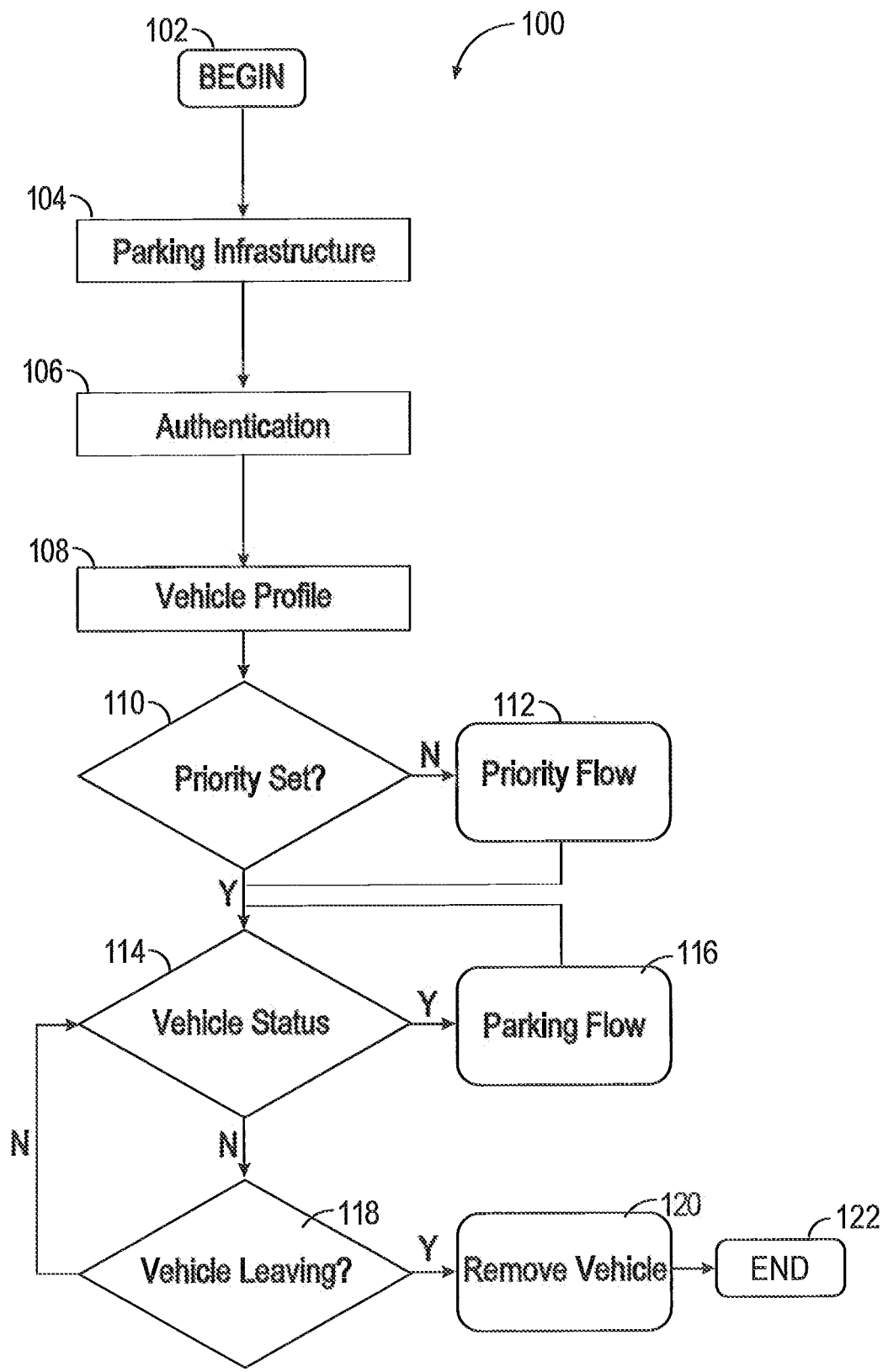
FIG. 2 illustrates an example method of selecting a parking spot for the motor vehicle of FIG. 1.

FIG. 2 illustrates an example method 100 of selecting a parking spot for the motor vehicle 10. As shown in FIG. 2, the method 100 begins at Block 102 and then proceeds to identify information regarding a selected infrastructure at Block 104. The information regarding the selected parking infrastructure can include a number of parking spaces in the parking structure, a pool of available parking spaces in the parking infrastructure, a location of each of the available parking spot at the parking infrastructure, and characteristics of each of the parking spaces. In one example, the characteristics of the parking spaces includes a size of the parking space, a distance of the parking space to points of interest, such as buildings, a membership status, such as priority, regular, base, or a handicapped designation for the parking space.

The method 100 then proceeds to Block 106 to authenticate a parking request received from the motor vehicle 10 for a desired parking infrastructure. The authentication of the request can occur in the cloud to avoid the parking infrastructure having to maintain servers for authentication purposes. The authentication process also eliminates false parking requests that could lead to parking spaces being assigned to vehicles that do not exist. The parking request by the motor vehicle 10 is then placed in a parking que with a plurality of other vehicles requesting parking at the parking infrastructure.

Once the parking request for the motor vehicle 10 has been authenticated, the method 100 reviews a vehicle profile for the motor vehicle 10 at Block 108. The vehicle profile can include predetermined parking preferences for the motor vehicle 10, such as desired parking locations at the parking infrastructure or size of the motor vehicle 10. The method uses the predetermined parking preferences for the motor vehicle 10 when assigning the parking space to ensure the motor vehicle 10 and user 62, such as an owner, are being properly accommodated. Once the vehicle profile has been received at Block 108, the method 100 determines if a parking priority is set at Block 110.

If the method 100 determines that the parking priority for motor vehicle 10 has yet to be determined, the method 100 will proceed to Block 112 to set the parking priority for the motor vehicle 10. The method 100 sets the parking priority at Block 112 by following a priority flow 200 illustrated in FIG. 3. The priority flow 200 begins at Block 202 and then proceeds to Block 204 to collect information regarding the motor vehicle 10 and the user 62 of the motor vehicle 10. The information is used to associate the parking priority with a parking priority score based on a plurality of predetermined criteria. In the illustrated example, the predetermined criteria can be based on membership levels with the parking infrastructure, such as priority members, if the motor vehicle 10 is assigned a parking space at the parking infrastructure at a frequency exceeding a predetermined threshold, if the motor vehicle 10 is associated with a user needing a parking space that is ADA compliant, or if the motor vehicle 10 only receives a base level of parking priority.

At Block 206, the priority flow 200 determines if the motor vehicle 10 or user are priority members. If the motor vehicle 10 or user are priority members, then the priority flow 200 assigns a predetermined priority parking score at Block 208, such as a numeric score of "20." However, other value could be used for scoring. If the motor vehicle 10 or user are not priority members, the priority flow 200 proceeds to Block 210.

At Block 210, the priority flow 200 determines if the motor vehicle 10 or user are regular customers. If they are regular customers, then the priority flow 200 assigns a predetermined parking priority score at Block 212, such as a numeric score of "10." If the motor vehicle 10 or user are not regular customers, then the priority flow 200 proceeds to Block 214.

At Block 214, the priority flow 200 determines if the motor vehicle 10 or user need a handicapped parking space that is ADA compliant. If they need the handicapped parking space, then the priority flow 200 assigns a predetermined maximum priority parking score at Block 216, such as "++." If the motor vehicle 10 or user do not need a handicapped parking space, then the priority flow 200 proceeds to Block 218.

At Block 218, the priority flow 200 determines if the motor vehicle 10 or user meets a custom priority criterion, such as a promotional parking criterion. If the motor vehicle 10, user, or the owner meet the custom priority criterion, then the priority flow 200 assigns a predetermined priority parking score at Block 220, such as "+Y" representing a numeric value of Y. If the motor vehicle 10 or user do not meet custom priority criterium, then the priority flow 200 proceeds to Block 222.

At Block 222, the priority flow 200 determines that the motor vehicle 10 or user have a base predetermined priority parking score and assigns a value of "0". The priority flow 200 then proceeds to end the priority flow 200 for the motor vehicle 10 at Block 224 having determined the parking priority score for the motor vehicle 10 and returns to the method 100.

With the priority set and the parking priority score determined by the priority flow at Block 112, the method 100 proceeds to Block 114 as shown in FIG. 2. If a vehicle status of the motor vehicle 10 at Block 114 is either waiting for a parking space at the parking infrastructure, parked in a temporary parking space, or arriving soon to the parking infrastructure, such as within a predetermined length of time, the method 100 proceeds to Block 116 to determine a parking flow 300 as shown in FIG. 4 and provide directions to the motor vehicle 10 to navigate to the assigned parking space.

Figure 4:
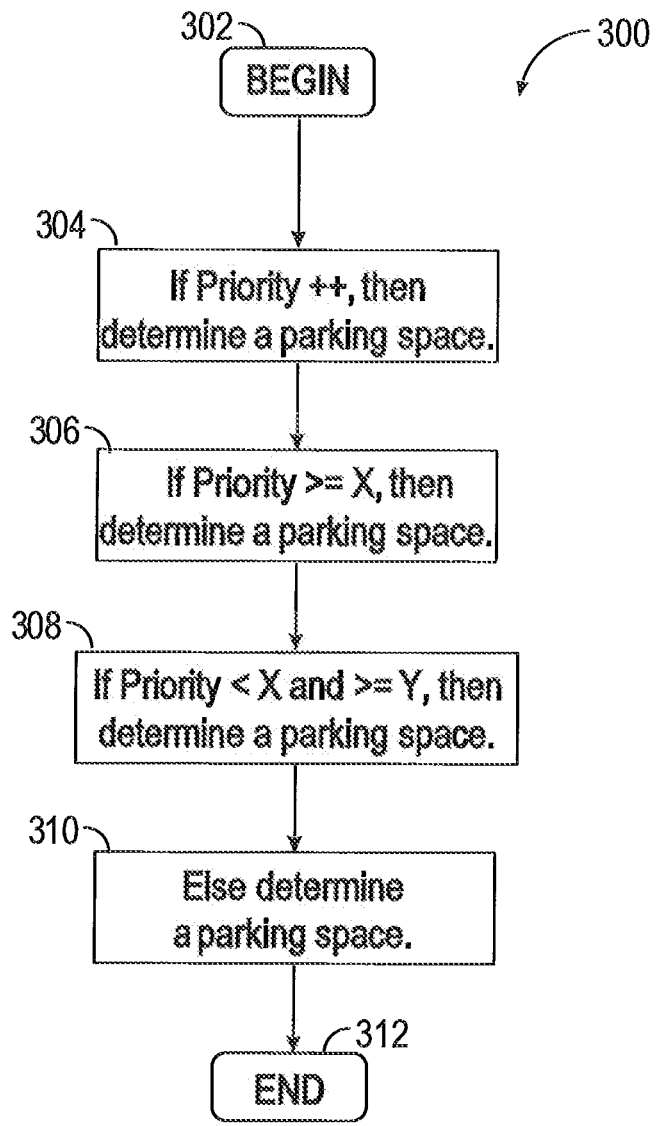
FIG. 4 illustrates an example parking flow for determining parking based on parking priority.

The parking flow 300 of FIG. 4 begins at Block 302 and proceeds to Block 304 to evaluate the parking priority score. If the parking priority score assigned as discussed above is ++ or max, then the parking flow determines the parking space relative to the parking priority scores of the other vehicles requesting parking at the parking infrastructure. With the parking priority score of max, it is then confirmed that motor vehicle 10 or user need a handicapped parking space. If they need the handicapped parking space, then the parking flow 300 at Block 304 will run a parking space query for a handicapped parking space in the pool of available parking spaces at the parking infrastructure and assign a handicapped parking space if available, the motor vehicle 10 will be directed to the available space meeting the handicapped needs.

If the handicapped parking space is not available, the parking flow 300 can direct the motor vehicle 10 to a temporary or short-term parking space in the pool of available parking spaces until a handicapped parking space becomes available. Alternatively, if there are not any temporary or short-term parking spaces available, the parking flow 300 will assign the motor vehicle 10 a standby status. With the standby status, the motor vehicle 10 could continue with the flow of traffic in the vicinity of the parking infrastructure or follow a flow of traffic within the parking infrastructure until the short-term or handicapped parking space becomes available.

If the priority of the motor vehicle 10 is not ++ or max, the parking flow 300 proceeds to Block 306. If the parking priority score is greater than or equal to X and less than max, the parking flow 300 will determine the parking space for the motor vehicle 10. The motor vehicle 10 or owner at this level could have a priority parking criterium discussed above. The parking flow 300 can then run a query for a priority parking spot or a regular parking space. If a priority parking space is available, the motor vehicle 10 will be assigned that parking space and be directed to that parking space. If a priority parking space is not available, the motor vehicle 10 can be directed to a regular parking spot if available.

If the priority or regular parking spots are not available for motor vehicle 10, the parking flow 300 will assign the motor vehicle 10 to a standby status. With the standby status, the motor vehicle 10 could continue with the flow of traffic in the vicinity of the parking infrastructure or follow a flow of traffic within the parking infrastructure until the priority or regular parking space becomes available. If the motor vehicle 10 or user with priority status are assigned a regular parking spot, the parking flow 300 will assign the regular parking space to the priority member before another vehicle requestion parking within the parking infrastructure with a lower parking priority score.

If the parking priority score for the motor vehicle 10 is less than X, the parking flow 300 proceeds to Block 308. If the parking priority score is less than X but greater than or equal to Y, the parking flow 300 will determine the parking space for the motor vehicle 10. The motor vehicle 10 or user at this level could have a regular customer parking designation or another parking designation, such as a promotional parking designation for using the infrastructure. The motor vehicle 10 could have a regular customer designation if the motor vehicle 10 is assigned a parking space at the parking infrastructure at a frequency exceeding a predetermined threshold. The parking flow 300 can then run a query for a regular parking space. If a regular parking spot is available, the motor vehicle 10 will be directed to that parking space.

If the regular parking space is not available, the parking flow 300 will assign the motor vehicle 10 to a standby status. With the standby status, the motor vehicle 10 could continue with the flow of traffic in the vicinity of the parking infrastructure or follow a flow of traffic within the parking infrastructure until the priority or regular parking spot becomes available. If the motor vehicle 10 or owner with priority status are assigned the regular parking space, they will be assigned before another vehicle requesting parking with a lower priority status.

If the priority of the motor vehicle 10 is less than Y, the parking flow 300 proceeds to Block 310 to determine a parking space. The motor vehicle 10 or user are assigned the lowest parking priority score of the above identified groups in the parking flow 300. The parking flow 300 can then run a query for a regular parking space. If a regular parking space is available, the motor vehicle 10 will be directed to that parking space.

If the regular parking space is not available, the parking flow 300 will assign the motor vehicle 10 a standby status. With the standby status, the motor vehicle 10 could continue with the flow of traffic in the vicinity of the parking infrastructure or follow a flow of traffic within the parking infrastructure until the priority or regular parking space becomes available. From Block 310, the parking flow 300 will proceed to Block 312 to end and return to the Block 114 of the method 100.

The method 100 will then determine if the vehicle status of the motor vehicle 10 is either waiting for parking, such as if it was given a standby status by the parking flow 300, at the parking infrastructure or arriving soon again at Block 114. If the motor vehicle 10 was given a standby status, the method 100 will proceed to Block 116 again to determine if a parking space for the motor vehicle 10 meeting its criteria has become available.

If the motor vehicle 10 was parked when the method 100 returned to Block 114, the method 100 will proceed to Block 118 and monitor a departure status of the motor vehicle 10 to determine if the motor vehicle 10 will be leaving the infrastructure within a predetermined length of time or has vacated the assigned parking space. If the motor vehicle 10 remains in the assigned parking space without an indication that the motor vehicle 10 will vacate the parking space, such as indicated by the expiration of a predetermined length of parking, the method 100 will continue to return to Block 114 until the motor vehicle 10 has vacated the assigned parking space or that was an indication that the parking space will become vacated within a predetermined length of time.

Once the motor vehicle 10 has vacated the assigned parking space, the method 100 will proceed to Block 120. At Block 120, the method 100 places the parking space occupied by the motor vehicle 10 into the pool of available parking spaces at the parking infrastructure and proceeds to Block 122 to end the method 100.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of selecting a parking spot for an autonomous vehicle, the method comprising:
   receiving a parking request to park the autonomous vehicle at a parking infrastructure;
   determining a parking priority score for the autonomous vehicle based on a sum of individual scores assigned to each of a plurality of predetermined criteria, wherein the plurality of predetermined criteria includes a frequency of the autonomous vehicle being assigned a parking space at the parking infrastructure and a parking membership associated with the parking infrastructure and the parking priority score is based on a membership level with the parking infrastructure;
   assigning a parking space for the autonomous vehicle from a pool of available parking spaces based on the parking priority score determined for the autonomous vehicle; and
   monitoring a departure status of the autonomous vehicle to determine if the autonomous vehicle is leaving the parking space and associating the parking space with the pool of available parking spaces based on the departure status of the autonomous vehicle changing to leaving the parking space, wherein the departure status includes determining if the autonomous vehicle has remained in the parking space for a predetermined length of time.

2. The method of claim 1, including providing directions to the autonomous vehicle to navigate to the parking space.

3. The method of claim 1, wherein receiving the parking request for the autonomous vehicle includes authenticating the parking request.

4. The method of claim 1, including assigning the parking space for the autonomous vehicle includes reviewing a vehicle profile associated with the autonomous vehicle having predetermined parking preferences for the autonomous vehicle and assigning the parking space to the autonomous vehicle based on the predetermined parking preferences and the parking priority score.

5. The method of claim 1, wherein receiving the parking request includes placing the autonomous vehicle into a parking queue with a plurality of other vehicles requesting parking at the parking infrastructure.

6. The method of claim 1, including assigning the autonomous vehicle a temporary parking space prior to assigning the parking space if the pool of available parking spaces does not include an available parking space matching the parking priority score of the autonomous vehicle.

7. The method of claim 1, wherein assigning the parking space for the autonomous vehicle remains in standby until the pool of available parking spaces includes an available parking space matching the parking priority score of the autonomous vehicle.

8. The method of claim 7, wherein assigning the parking space for the autonomous vehicle remains in standby includes directing the autonomous vehicle to remain in a flow of traffic within a predetermined distance of the parking infrastructure.

9. The method of claim 1, wherein associating the parking space with the pool of available parking spaces is based on the departure status of the autonomous vehicle changing to vacated the parking space.

10. The method of claim 1, wherein associating the parking space with the pool of available parking spaces based on the departure status of the autonomous vehicle changing to leaving the parking space occurs prior to the autonomous vehicle vacating the parking space.

11. The method of claim 1, wherein determining the frequency that the autonomous vehicle is assigned a parking space at the parking infrastructure includes running a query to determine if the autonomous vehicle is assigned a regular parking space and determining if the regular parking space is in the pool of available parking spaces.

12. The method of claim 11, including placing the autonomous vehicle in standby if the regular parking space is not in the pool of available parking spaces and directing the autonomous vehicle to remain in a flow of traffic within a predetermined distance of the parking infrastructure until the regular parking space is in the pool of available parking spaces.

13. A non-transitory computer-readable storage medium embodying programmed instructions which, when executed by a processor, are operable for performing a method comprising:
   receiving a parking request to park an autonomous vehicle at a parking infrastructure;
   determining a parking priority score for the autonomous vehicle based on a plurality of predetermined criteria including a frequency of the autonomous vehicle being assigned a parking space at the parking infrastructure and a parking membership associated with the parking infrastructure and the parking priority score is based on a membership level with the parking infrastructure;
   assigning a parking space for the autonomous vehicle from a pool of available parking spaces based on the parking priority score determined for the autonomous vehicle; and
   monitoring a departure status of the autonomous vehicle to determine if the autonomous vehicle is leaving the parking space and associating the parking space with the pool of available parking spaces based on the departure status of the autonomous vehicle changing to leaving the parking space, wherein the departure status includes determining if the autonomous vehicle has remained in the parking space for a predetermined length of time.

14. The storage medium of claim 13, wherein the method includes providing directions to the autonomous vehicle to navigate to the parking space.

15. The storage medium of claim 13, wherein receiving the parking request includes placing the autonomous vehicle into a parking queue with a plurality of other vehicles requesting parking at the parking infrastructure.

16. The storage medium of claim 13, wherein assigning the parking space for the autonomous vehicle remains in standby until the pool of available parking spaces includes an available parking space matching the parking priority score of the autonomous vehicle.

17. The storage medium of claim 13, wherein associating the parking space with the pool of available parking spaces is based on the departure status of the autonomous vehicle changing to vacated the parking space.

18. The storage medium of claim 13, wherein associating the parking space with the pool of available parking spaces based on the departure status of the autonomous vehicle changing to leaving the parking space occurs prior to the autonomous vehicle vacating the parking space.

19. An autonomous vehicle system comprising:
  a traction motor;
  a traction battery in communication with the traction motor;
  a plurality of sensors; and
  a controller in communication with the plurality of sensors, the controller configured to:
    send a parking request to park an autonomous vehicle at a parking infrastructure;
    receive an assigned parking space from a pool of available parking spaces based on a parking priority score determined for the autonomous vehicle, wherein the parking priority score for the autonomous vehicle based on a sum of individual scores assigned to each of a plurality of predetermined criteria, wherein the plurality of predetermined criteria includes a frequency of the autonomous vehicle being assigned a parking space at the parking infrastructure and a parking membership associated with the parking infrastructure and the parking priority score is based on a membership level with the parking infrastructure; and
    navigate to the assigned parking space within the parking infrastructure.

\* \* \* \* \*